United States Patent
Saito et al.

(10) Patent No.: US 7,198,031 B2
(45) Date of Patent: Apr. 3, 2007

(54) CONTROL DEVICE OF INTERNAL COMBUSTION ENGINE

(75) Inventors: Haruhiko Saito, Toyota (JP); Tomihisa Tsuchiya, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/401,313

(22) Filed: Apr. 11, 2006

(65) Prior Publication Data

US 2006/0225703 A1     Oct. 12, 2006

(30) Foreign Application Priority Data

Apr. 12, 2005    (JP) .............................. 2005-114715

(51) Int. Cl.
 *F02B 7/00*  (2006.01)
 *F02D 13/00* (2006.01)

(52) U.S. Cl. ................... 123/431; 123/90.15; 123/345

(58) Field of Classification Search ............... 123/431, 123/299, 300, 90.15, 345–348

See application file for complete search history.

(56) References Cited

U.S. PATENT DOCUMENTS 6,640,785 B2 * 11/2003 Almkvist ................... 123/492
6,971,364 B2 * 12/2005 Pilgram et al. ............. 123/299
2005/0000486 A1 * 1/2005 Kuzuyama et al. ......... 123/299

FOREIGN PATENT DOCUMENTS

| EP | 1 457 650 A2 | 9/2004 |
|---|---|---|
| EP | 1 574 697 A1 | 9/2005 |
| JP | A 11-324765 | 11/1999 |
| JP | A 2001-20837 | 1/2001 |
| JP | A 2003-13784 | 1/2003 |

* cited by examiner

*Primary Examiner*—Hai Huynh
(74) *Attorney, Agent, or Firm*—Oliff & Berridge, PLC

(57) ABSTRACT

An engine ECU executes a program including the steps of: selecting a map for a warm state or a map for a cold state based on an engine coolant temperature after an engine is started and rapid catalyst warm-up ends; calculating DI ratio r; calculating when to inject fuel from an intake manifold injector as time in synchronization with air intake if a load factor is equal to or greater than a threshold value and fuel is injected from injectors at a ratio predetermined therebetween; and otherwise calculating when to inject fuel from the intake manifold injector as during a period in which an intake valve is closed.

13 Claims, 7 Drawing Sheets

F I G. 5

|  | RAPID CATALYST WARM-UP CONTROL |  |
|---|---|---|
| IGNITION TIMING | SIGNIFICANTLY RETARDED | UNBURNED HC DECREASED, TEMPRATURE OF EXHAUST RAISED |
| TIMING OF INJECTION FROM IN-CYLINDER INJECTOR | INJECTION IN COMPRESSION STROKE | RICH AIR-FUEL RATIO IN THE VICINITY OF SPARK PLUG, SEMI-STRATIFIED CHARGE COMBUSTION |
| AMOUNT OF FUEL | DECREASED | UNBURNED HC DECREASED |
| AMOUNT OF AIR | AMOUNT INCREASED AS COMPARED WITH AMOUNT DURING IDLE | TORQUE DOWN AVOIDED |
| DI RATIO r | r = 0.5 TO 0.65 | RICH AIR-FUEL RATIO IN THE VICINITY OF SPARK PLUG, SEMI-STRATIFIED CHARGE COMBUSTION |

CONTROL DEVICE OF INTERNAL COMBUSTION ENGINE

This nonprovisional application is based on Japanese Patent Application No. 2005-114715 filed with the Japan Patent Office on Apr. 12, 2005, the entire contents of which are hereby incorporated by reference.

BACKGROUND OF THE INVENTION

1. Field of the Invention

The present invention relates to a control device of an internal combustion engine that includes a first fuel injection mechanism (in-cylinder injector) for injecting fuel into a cylinder and a second fuel injection mechanism (intake manifold injector) for injecting fuel into an intake manifold or an intake port, and more particularly to a technique to determine when to inject fuel from the second fuel injection mechanism in homogenous combustion.

2. Description of the Background Art

An internal combustion engine provided with an intake manifold injector for injecting fuel into an intake manifold of an internal combustion engine and an in-cylinder injector for constantly injecting fuel into a combustion chamber thereof, in which fuel injection from the intake manifold injector is stopped when load of the internal combustion engine is lower than preset load and fuel injection from the intake manifold injector is allowed when load of the internal combustion engine is higher than the preset load, has been known.

In addition, among the internal combustion engines, an internal combustion engine switching between stratified charge combustion and homogenous combustion in accordance with an operation state thereof has been known. Here, stratified charge combustion refers to such combustion that fuel is injected from the in-cylinder injector in the compression stroke to form a concentrated and stratified air-fuel mixture around a spark plug, thus achieving lean combustion of the fuel. Meanwhile, homogenous combustion refers to combustion of fuel in such a manner that the fuel is diffused in the combustion chamber to form a homogenous air-fuel mixture.

Japanese Patent Laying-Open No. 2001-20837 discloses a fuel injection control device of an engine, the engine switching between stratified charge combustion and homogeneous combustion in accordance with an operation state and having a main fuel injection valve injecting fuel directly into a combustion chamber and an auxiliary fuel injection valve injecting fuel into an intake port of each cylinder. The fuel injection control device of the engine switching between stratified charge combustion and homogeneous combustion in accordance with the operation state includes the main fuel injection valve injecting fuel directly into the combustion chamber and the auxiliary fuel injection valve injecting fuel into the intake port of each cylinder, and a ratio of fuel injection amount between the main fuel injection valve and the auxiliary fuel injection valve is set as variable based on the engine operation state.

According to the fuel injection control device of the engine, stratified charge combustion is carried out solely with the fuel directly injected from the main fuel injection valve into the combustion chamber, and homogenous combustion is carried out using both of the main fuel injection valve and the auxiliary fuel injection valve (in some cases, solely the auxiliary fuel injection valve is used), so that a capacity of the main fuel injection valve can be small even in a high-output engine. Therefore, linearity of injection period-injection amount characteristic of the main fuel injection valve in a low load region such as idling is enhanced, satisfactory stratified charge combustion can be maintained as a result of improvement in accuracy in injection amount control, and stability of a low-load operation such as idling is improved. Both of the main fuel injection valve and the auxiliary fuel injection valve are used in homogenous combustion to make use of advantages of direct fuel injection and advantages of intake port injection, thus also maintaining satisfactory homogenous combustion.

In the fuel injection control device of the engine disclosed in Japanese Patent Laying-Open No. 2001-20837, stratified charge combustion and homogenous combustion are appropriately selected depending on a situation. Accordingly, control of ignition, injection and throttle becomes complicated, and a control program adapted to each combustion manner is required. In particular, in switching between combustion manners, such control should significantly be modified and it is difficult to carry out excellent control (fuel efficiency, exhaust purifying performance) at the time of transition. In addition, as a three-way catalyst does not function in a stratified charge combustion region where lean combustion is conducted, a lean NOx catalyst should be used, which leads to increase in cost.

In view of these facts, an engine which requires neither control in switching between stratified charge combustion and homogenous combustion nor the expensive lean NOx catalyst but carries out, during a normal operation, homogenous combustion in all regions (except for an abnormal state, that is, rapid catalyst warm-up) instead of stratified charge combustion has been developed.

In such an engine, however, homogeneity is low in a region where engine speed is low and load is high, and torque fluctuation may become significant. In addition, if the fuel is injected from the intake manifold injector in the intake stroke and introduced in the combustion chamber in a liquid state, deposits are accumulated in an injection hole of the in-cylinder injector. The disclosure of Japanese Patent Laying-Open No. 2001-20837 merely states that a ratio of injection from the auxiliary fuel injection valve injecting the fuel into the intake port is set such that it is increased with the increase in engine output (engine speed, load) in the region where homogenous combustion is conducted, and Japanese Patent Laying-Open No. 2001-20837 does not solve the above-described problems.

SUMMARY OF THE INVENTION

The present invention was made to solve the above-described problems, and an object of the present invention is to provide a control device of an internal combustion engine capable of solving the problem raised by combination of stratified charge combustion and homogenous combustion, the problem of homogeneity, and the problem of deposits in an in-cylinder injector in the internal combustion engine in which fuel is injected from a first fuel injection mechanism injecting fuel into a cylinder and a second fuel injection mechanism injecting fuel in an intake manifold at a prescribed ratio therebetween.

A control device of an internal combustion engine according to the present invention controls the internal combustion engine including a first fuel injection mechanism injecting fuel into a cylinder and a second fuel injection mechanism injecting fuel into an intake manifold. The control device includes a determination unit determining whether or not the internal combustion engine is in a normal operation state, and a control unit controlling the first fuel injection mechanism and the second fuel injection mechanism based on information associated with an operation state of the internal combustion engine such that solely homogenous combustion is conducted if it is determined that the internal combustion engine is in the normal operation state. The control unit controls fuel injection such that fuel is injected from the second fuel injection mechanism while an intake valve is closed.

According to the present invention, when homogenous combustion (air-fuel ratio set to 12 to 15) is conducted in the normal operation state (for example, in all operation regions except for rapid catalyst warm-up alone) (therefore, switching to stratified charge combustion is not made and there is no problem due to combination of stratified charge combustion and homogenous combustion), fuel is injected from the intake manifold injector representing the second fuel injection mechanism while the intake valve is closed. In this case, the fuel adheres to an inner wall of the intake manifold, a backside of an umbrella-shaped portion of the intake valve, a valve stem (shaft), or the like. The adhered fuel is vaporized by the time of opening of the intake valve in the intake stroke, and the vaporized fuel is introduced in the combustion chamber when the intake valve opens. Accordingly, accumulation of deposits is unlikely, which has been caused by adhesion of the fuel to the injection hole of the in-cylinder injector representing the first fuel injection mechanism when the fuel is injected from the intake manifold injector while the intake valve is open and the fuel in the liquid state is introduced in the combustion chamber. As the fuel injected from the intake manifold injector is introduced in the combustion chamber in a vaporized state, homogeneity is improved. Consequently, a control device of an internal combustion engine capable of solving the problem raised by combination of stratified charge combustion and homogenous combustion, the problem of homogeneity, and the problem of deposits in the in-cylinder injector in the internal combustion engine in which fuel is injected from the first fuel injection mechanism injecting the fuel into the cylinder and the second fuel injection mechanism injecting the fuel into the intake manifold at a ratio predetermined therebetween can be provided.

Preferably, the control unit further includes an injection control unit controlling fuel injection such that fuel is injected from the first fuel injection mechanism while the intake valve is open.

According to the present invention, as the fuel is injected from the in-cylinder injector while the intake valve is open, the fuel injected from the in-cylinder injector is sufficiently diffused by a flow of intake air, and homogeneity in fuel concentration (air-fuel ratio) in the combustion chamber is improved.

Preferably, the determination unit determines that the internal combustion engine is in an abnormal operation state, in a catalyst warm-up operation during idling. The control device further includes an injection control unit controlling the fuel injection mechanism so as to conduct stratified charge combustion when the internal combustion engine is in the abnormal operation state.

According to the present invention, fuel is injected from the in-cylinder injector in the compression stroke, so that the fuel injected in the vicinity of the spark plug is concentrated to attain a rich state and an area around the former attains a lean state (stratified). Namely, solely the fuel in an amount necessary for ignition is present in the vicinity of the spark plug, and the fuel around the same is used for afterburning, thus contributing to catalyst warm-up. It is noted that stratified charge combustion (air-fuel ratio set to approximately 17 to 40) encompasses semi-stratified charge combustion (air-fuel ratio set to 15 to 25).

Preferably, the information includes information representing an injection ratio between the first fuel injection mechanism and the second fuel injection mechanism, that is defined based on an engine speed and a load factor of the internal combustion engine.

According to the present invention, the injection ratio between the in-cylinder injector and the intake manifold injector is determined based on the engine speed and the load factor of the internal combustion engine, and homogenous combustion can be conducted in the normal operation at any engine speed and at any load factor.

Preferably, the first fuel injection mechanism is an in-cylinder injector, and the second fuel injection mechanism is an intake manifold injector.

According to the present invention, the control device of the internal combustion engine capable of solving the problem raised by combination of stratified charge combustion and homogenous combustion, the problem of homogeneity, and the problem of deposits in the in-cylinder injector in the internal combustion engine in which the in-cylinder injector representing the first fuel injection mechanism and the intake manifold injector representing the second fuel injection mechanism are separately provided and fuel is injected from the injectors at a ratio predetermined therebetween can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a condition for processing of rapid catalyst warm-up in the embodiment of the present invention.

DESCRIPTION OF THE PREFERRED EMBODIMENTS

Figure 1:
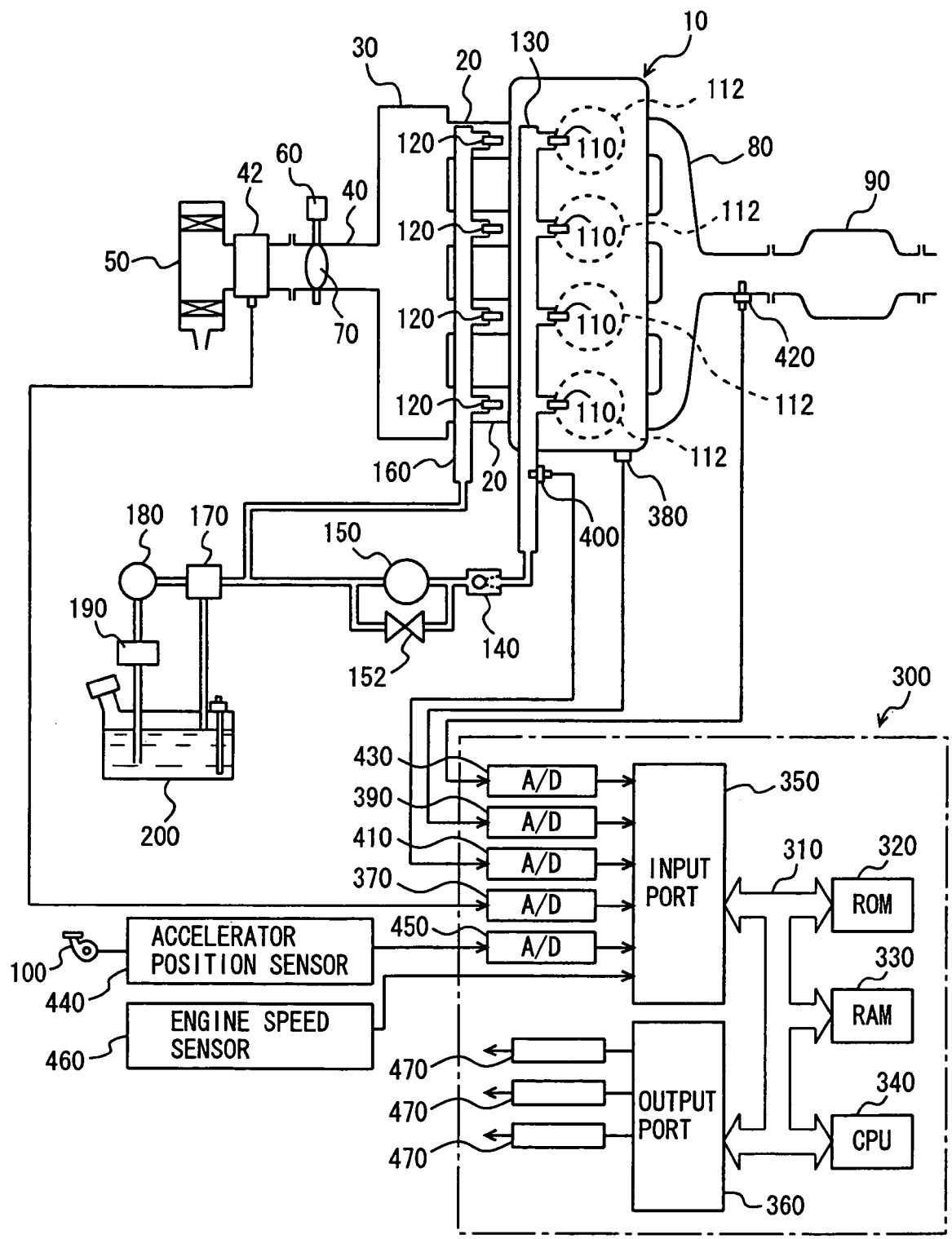
FIG. 1 is a schematic configuration diagram of an engine system controlled by a control device according to an embodiment of the present invention.

An embodiment of the present invention will be described hereinafter with reference to the drawings. The same elements have the same reference characters allotted. Their label and function are also identical. Therefore, detailed description thereof will not be repeated.

FIG. 1 schematically shows a configuration of an engine system controlled by an engine ECU (Electronic Control Unit) that is a control device of an internal combustion engine according to an embodiment of the present invention. Although an in-line 4-cylinder gasoline engine is shown in FIG. 1, application of the present invention is not restricted to the engine shown, and the engine may be a V-type 6-cylinder engine, a V-type 8-cylinder engine and an in-line 6-cylinder engine.

As shown in FIG. 1, an engine 10 includes four cylinders 112, which are connected via corresponding intake manifolds 20 to a common surge tank 30. Surge tank 30 is connected via an intake duct 40 to an air cleaner 50. In intake duct 40, an airflow meter 42 and a throttle valve 70, which is driven by an electric motor 60, are disposed. Throttle valve 70 has its opening position controlled based on an output signal of an engine ECU 300, independently of an accelerator pedal 100. Cylinders 112 are connected to a common exhaust manifold 80, which is in turn connected to a three-way catalytic converter 90.

For each cylinder 112, an in-cylinder injector 110 for injecting fuel into the cylinder and an intake manifold injector 120 for injecting fuel into an intake port and/or an intake manifold are provided. These injectors 110, 120 are controlled based on output signals of engine ECU 300. In-cylinder injectors 110 are connected to a common fuel delivery pipe 130. Fuel delivery pipe 130 is connected to a high-pressure fuel pump 150 of an engine driven type via a check valve 140 that allows flow toward fuel delivery pipe 130. In the present embodiment, description will be made as to the internal combustion engine having two injectors provided separately, although the present invention is not limited thereto. For example, the internal combustion engine may have a single injector capable of performing both in-cylinder injection and intake manifold injection.

As shown in FIG. 1, the discharge side of high-pressure fuel pump 150 is connected to the intake side of high-pressure fuel pump 150 via an electromagnetic spill valve 152. It is configured such that the amount of the fuel supplied from high-pressure fuel pump 150 to fuel delivery pipe 130 increases as the degree of opening of electromagnetic spill valve 152 is smaller, and that fuel supply from high-pressure fuel pump 150 to fuel delivery pipe 130 is stopped when electromagnetic spill valve 152 is fully opened. Electromagnetic spill valve 152 is controlled based on an output signal of engine ECU 300.

Meanwhile, intake manifold injectors 120 are connected to a common fuel delivery pipe 160 on the low-pressure side. Fuel delivery pipe 160 and high-pressure fuel pump 150 are connected to a low-pressure fuel pump 180 of an electric motor driven type via a common fuel pressure regulator 170. Further, low-pressure fuel pump 180 is connected to a fuel tank 200 via a fuel filter 190. Fuel pressure regulator 170 is configured to return a part of the fuel discharged from low-pressure fuel pump 180 to fuel tank 200 when the pressure of the fuel discharged from low-pressure fuel pump 180 becomes higher than a preset fuel pressure. This prevents the pressure of the fuel supplied to intake manifold injectors 120 as well as the pressure of the fuel supplied to high-pressure fuel pump 150 from becoming higher than the preset fuel pressure.

Engine ECU 300 is configured with a digital computer, which includes a ROM (Read Only Memory) 320, a RAM (Random Access Memory) 330, a CPU (Central Processing Unit) 340, an input port 350, and an output port 360, which are connected to each other via a bidirectional bus 310.

Airflow meter 42 generates an output voltage that is proportional to an intake air amount, and the output voltage of airflow meter 42 is input via an A/D converter 370 to input port 350. A coolant temperature sensor 380 is attached to engine 10, which generates an output voltage proportional to an engine coolant temperature. The output voltage of coolant temperature sensor 380 is input via an A/D converter 390 to input port 350.

A fuel pressure sensor 400 is attached to fuel delivery pipe 130, which generates an output voltage proportional to a fuel pressure in fuel delivery pipe 130. The output voltage of fuel pressure sensor 400 is input via an A/D converter 410 to input port 350. An air-fuel ratio sensor 420 is attached to exhaust manifold 80 located upstream of three-way catalytic converter 90. Air-fuel ratio sensor 420 generates an output voltage proportional to an oxygen concentration in the exhaust gas, and the output voltage of air-fuel ratio sensor 420 is input via an AID converter 430 to input port 350.

Air-fuel ratio sensor 420 in the engine system of the present embodiment is a full-range air-fuel ratio sensor (linear air-fuel ratio sensor) that generates an output voltage proportional to an air-fuel ratio of the air-fuel mixture burned in engine 10. As air-fuel ratio sensor 420, an $O_2$ sensor may be used which detects, in an on/off manner, whether the air-fuel ratio of the mixture burned in engine 10 is rich or lean with respect to a stoichiometric air-fuel ratio.

Accelerator pedal 100 is connected to an accelerator position sensor 440 that generates an output voltage proportional to a degree of press-down of accelerator pedal 100. The output voltage of accelerator position sensor 440 is input via an A/D converter 450 to input port 350. An engine speed sensor 460 generating an output pulse representing the engine speed is connected to input port 350. ROM 320 of engine ECU 300 prestores, in the form of a map, values of fuel injection amount that are set corresponding to operation states based on the engine load factor and the engine speed obtained by the above-described accelerator position sensor 440 and engine speed sensor 460, respectively, and the correction values based on the engine coolant temperature.

Figure 2:
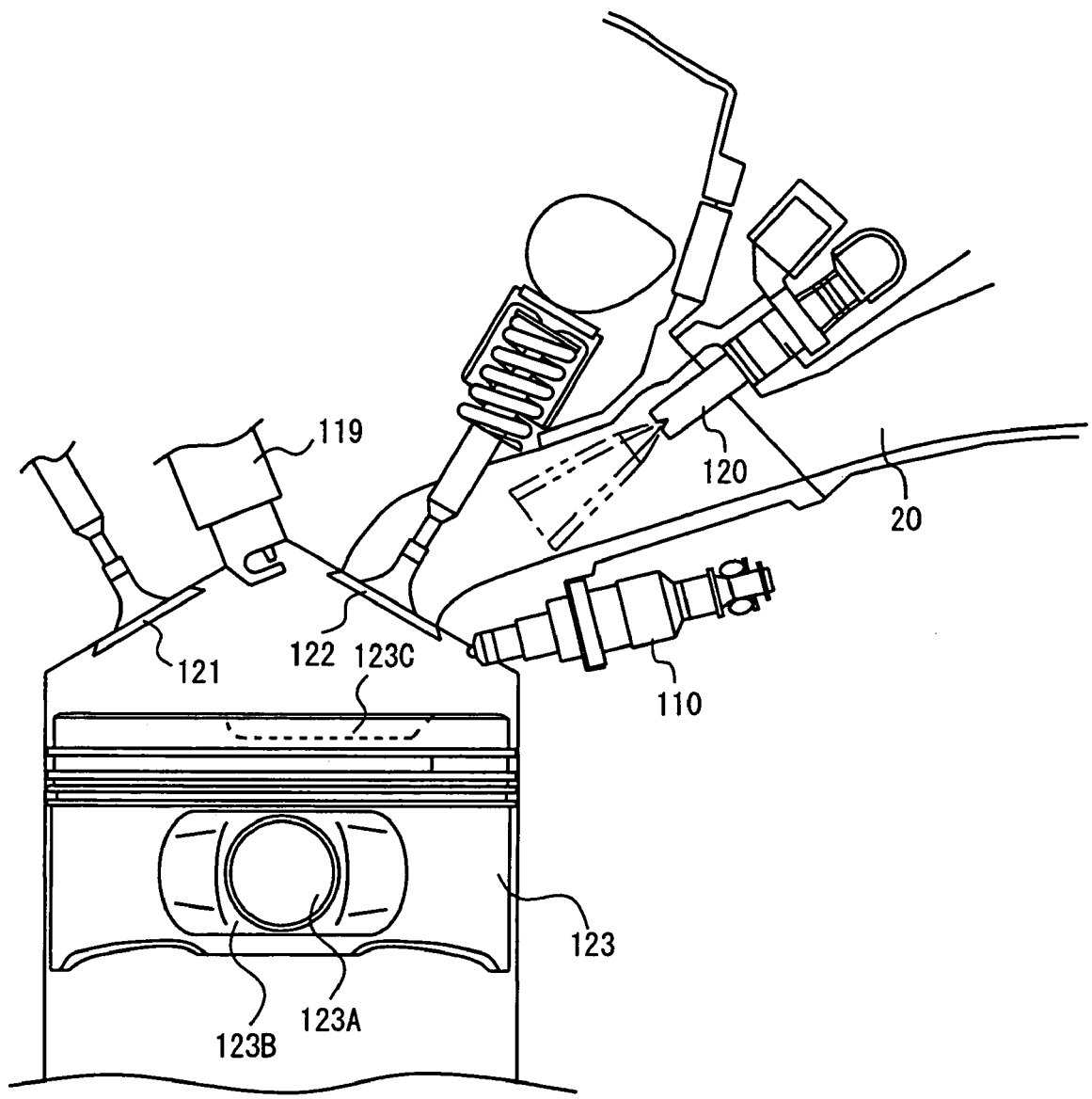
FIG. 2 is a partially enlarged view of FIG. 1.

FIG. 2 is a partially enlarged view of FIG. 1. FIG. 2 illustrates positional relation of in-cylinder injector 110 and intake manifold injector 120 in each cylinder 112 shown in FIG. 1 as well as positional relation of intake manifold 20, an intake valve 122, an exhaust valve 121, a spark plug 119, and a piston 123.

Intake valve 122 is provided on the combustion chamber side of intake manifold 20, and intake manifold injector 120 is arranged upstream of intake valve 122. Intake manifold injector 120 injects the fuel toward an inner wall of intake manifold 20 that serves as an intake air passage.

An example of a direction of fuel injection from intake manifold injector 120 may be as follows.

PM (Particulate Matter) within the combustion chamber flows back to intake manifold 20 due to overlap between intake valve 122 and exhaust valve 121, and the fuel injected from intake manifold injector 120 is sprayed. Then, particulate fuel serves as an adhesive and may remain as deposits on the inner wall of intake manifold 20 on a side close to intake valve 122. The direction of fuel injection from intake manifold injector 120 is set to a direction toward the deposits, so that the deposits can be washed away by the fuel injected from the intake manifold injector 120.

In intake manifold 20, a component for forming a vortex flow in the combustion chamber such as a swirl control valve is not provided. If such a swirl control valve is provided, the flow coefficient is lowered and air in an amount necessary and sufficient at the time of WOT cannot flow into the combustion chamber. In the internal combustion engine according to the present embodiment, however, a higher flow coefficient is set so as to implement a high flow rate port. It is noted that a tangential type intake port may be provided, so long as a high flow rate can be achieved. The tangential type port does not have such a spiraling shape around intake valve 122 as swinging to the left and right but extends straight and has an arcing end portion swinging up and down along a large arc. Therefore, resistance to flow within the intake port is small, and the flow coefficient of the intake port is much greater than that of the swirl port. Namely, volumetric efficiency of engine 10 is higher, and a large amount of air can be suctioned into the combustion chamber. Preferably, a flow coefficient Cf of the intake port is set to a value of 0.5 to 0.7 or higher.

As shown in FIG. 2, a cavity 123C which is a recess having a gently curved contour is provided in the top portion of piston 123, in a position opposing in-cylinder injector 110. The fuel is injected from in-cylinder injector 110 toward cavity 123C. As the top portion of piston 123 opposing in-cylinder injector 110 does not have a corner portion, the spray formed by the fuel injected from in-cylinder injector 110 is not divided by the corner portion. If the sprayed fuel is divided, a local rich state that adversely affects combustion (local rich herein refers to formation of a rich air-fuel mixture in an area other than the area in the vicinity of spark plug 119) may be caused. Such a state, however, can be avoided. It is noted that a ratio of fuel injection between in-cylinder injector 110 and intake manifold injector 120 arranged as shown in FIG. 2 will be described in detail later.

Engine ECU 300 representing the control device according to the present embodiment carries out homogenous combustion in the normal operation of engine 10 (in a state other than the abnormal state, assuming that the rapid catalyst warm-up is the abnormal state), that is, in all operation regions of engine 10. Here, fuel has conventionally been injected from intake manifold injector 120 while intake valve 122 is open. On the other hand, according to engine ECU 300, fuel is injected from intake manifold injector 120 while intake valve 122 is closed (in the exhaust stroke of engine 10).

Figure 3:
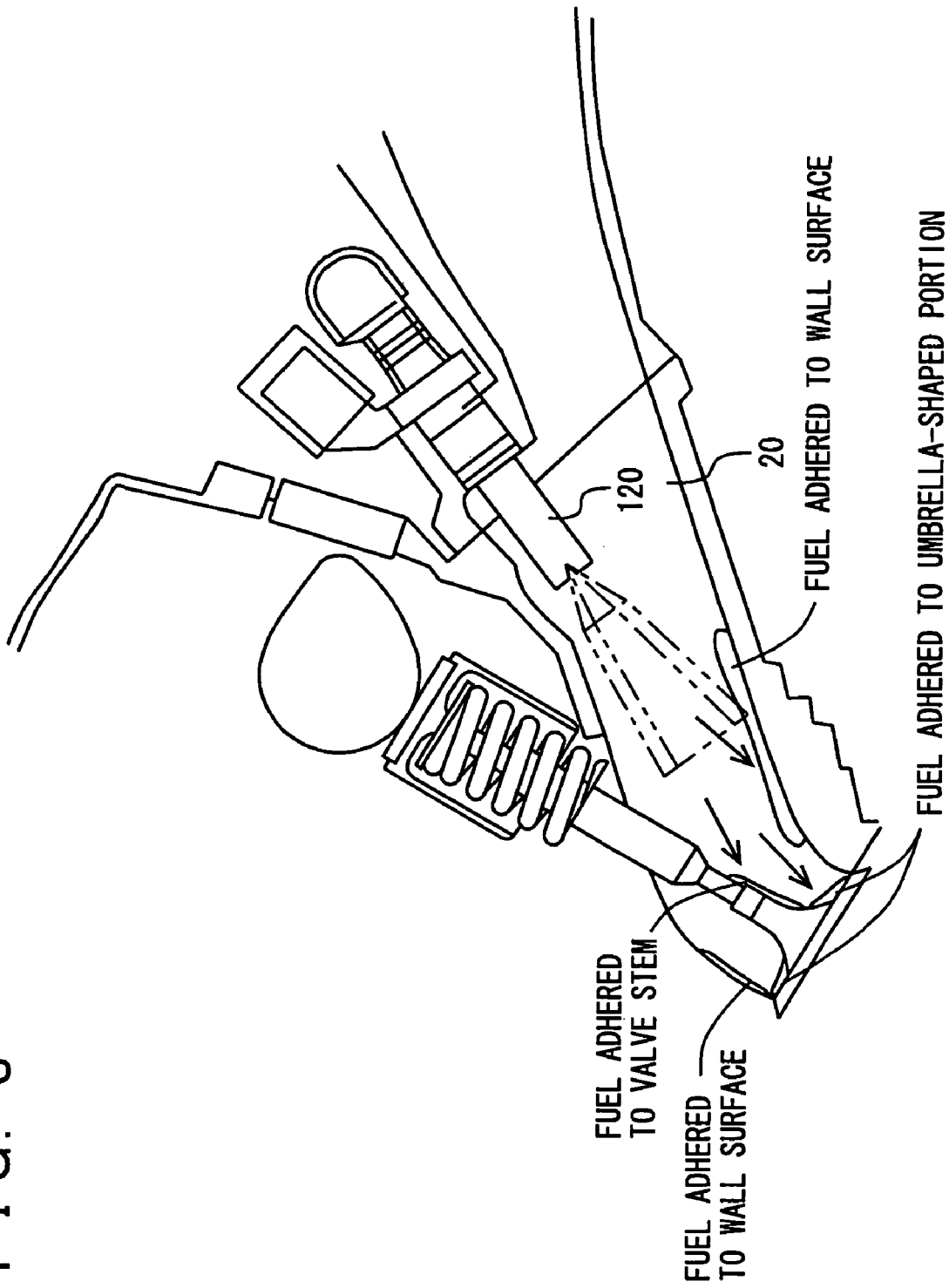
FIG. 3 illustrates adhesion to a wall surface.

FIG. 3 shows a state in which fuel is injected from intake manifold injector 120 while intake valve 122 is closed (in the exhaust stroke). The fuel (liquid) injected from intake manifold injector 120 while intake valve 122 is closed adheres to the inner wall of intake manifold 20 as wall-surface-adhered fuel, adheres to the backside of the umbrella-shaped portion of intake valve 122 as umbrella-shaped-portion-adhered fuel, or adheres to the valve stem (shaft) of intake valve 122 as valve-stem-adhered fuel. The temperature of such a portion close to the combustion chamber, however, is very high relative to the boiling point of the fuel, and the fuel is readily vaporized. Namely, the fuel is vaporized when intake valve 122 opens (in the intake stroke including valve overlap in which exhaust valve 121 and intake valve 122 are both open), and the fuel not in the liquid state but in the vaporized state is introduced in the combustion chamber. Accordingly, homogeneity of the air-fuel mixture in the combustion chamber is improved by the fuel injected from intake manifold injector 120. If the fuel is injected from in-cylinder injector 110 and intake manifold injector 120 at a ratio predetermined therebetween, fuel is injected from in-cylinder injector 110 while intake valve 121 is open. Therefore, the fuel injected from in-cylinder injector 110 is readily diffused as a result of the airflow from intake manifold 20 to the combustion chamber, and homogeneity of the air-fuel mixture in the combustion chamber is improved.

As will be described later, if the load requested in engine 10 is equal to or greater than a predetermined threshold value and if fuel is injected from in-cylinder injector 110 and intake manifold injector 120 at a ratio predetermined therebetween, fuel may be injected from intake manifold injector 120 while intake valve 122 is open.

Figure 4:
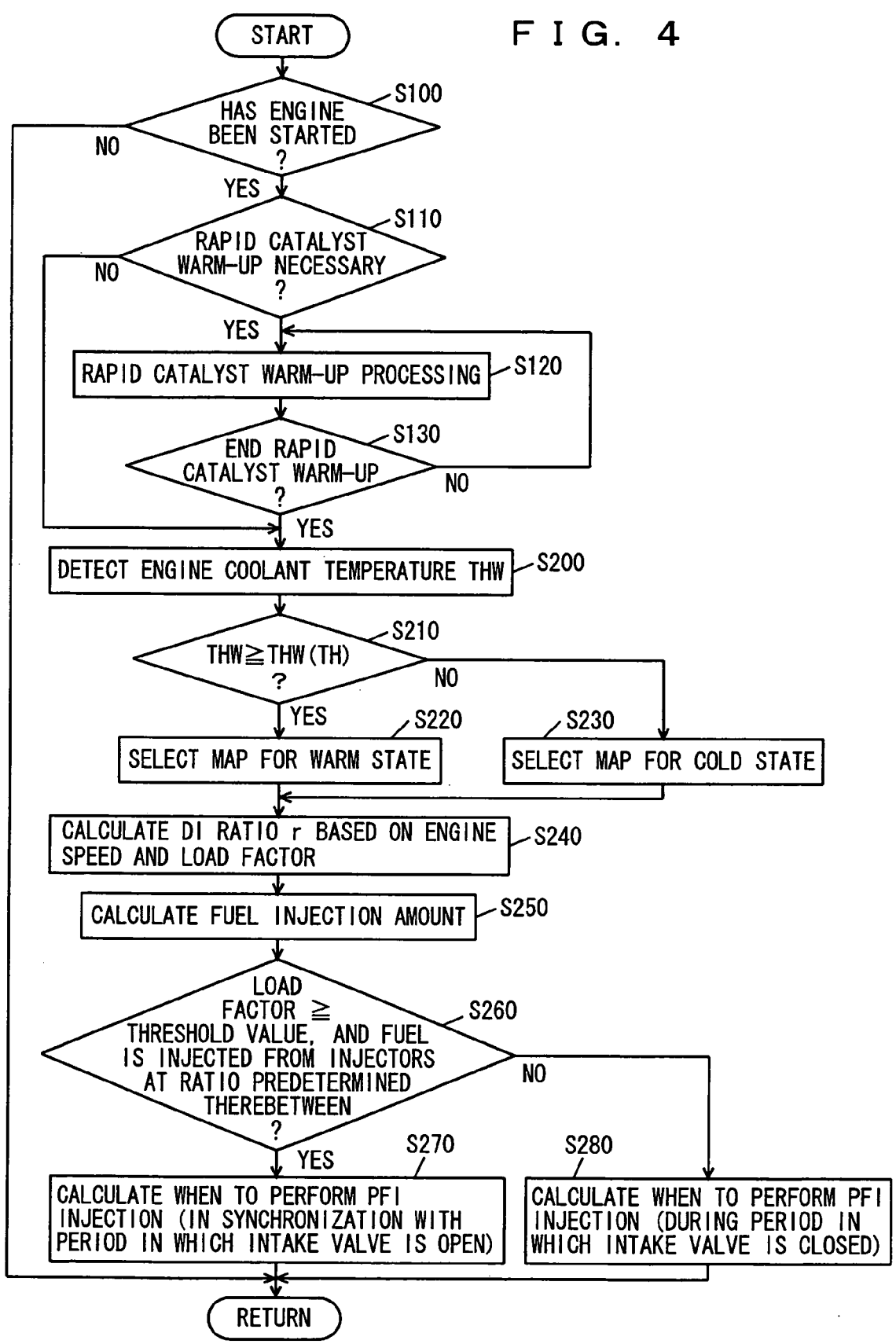
FIG. 4 is a flowchart showing a control configuration of a program executed by an engine ECU shown in FIG. 1.

A control configuration of a program executed by engine ECU 300 representing the control device according to the embodiment of the present invention will be described with reference to FIG. 4.

At step (hereinafter, step is abbreviated as S) 100, engine ECU 300 determines whether engine 10 has been started or not. Here, determination is made based on an engine start request signal input from other ECU to engine ECU 300 or a result of processing by engine ECU 300 itself. When engine 10 starts (YES at S100), the process proceeds to S110. Otherwise (NO at S100), the process ends.

At step S110, engine ECU 300 determines whether or not rapid catalyst warm-up is necessary. As described above, rapid catalyst warm-up is determined as necessary, unless three-way catalytic converter 90 is activated based on variation in a detection signal from an oxygen sensor provided downstream of three-way catalytic converter 90. Alternatively, whether or not rapid catalyst warm-up is necessary may be determined based on a temperature of an engine coolant or a temperature of an engine oil. If rapid catalyst warm-up is necessary (YES at S110), the process proceeds to S120. Otherwise (NO at S110), the process proceeds to S200.

At step S120, engine ECU 300 performs rapid catalyst warm-up processing. Here, for example as shown in FIG. 5, engine ECU 300 controls ignition timing, injection timing of in-cylinder injector 110, an amount of fuel injection, an amount of air supply, and DI ratio r. It is noted that the value of the DI ratio in FIG. 4 is only by way of example, and it may be set to 50% or greater (the ratio of fuel injection from in-cylinder injector 110 is equal to or greater than the ratio of fuel injection from intake manifold injector 120). As to decrease in the amount of fuel, for example, a lean state in which the air-fuel ratio of the exhaust is set to approximately 15.5 should only be achieved. Such decrease leads to decrease in unburned HC. Though the amount of fuel is increased immediately after the start of engine 10 (corrective increase in the amount of fuel in order to meet the demand for torque at the time of start of engine 10, or corrective increase in the amount of fuel for addressing adhesion to the wall surface), the amount of fuel is decreased, because the torque as great as that at the time of start is not requested after the start of the engine or because the fuel adhered to the wall surface is saturated. In this manner, even if the amount of fuel injection from in-cylinder injector 110 in the compression stroke is decreased, fuel in an amount necessary for ignition is present around the spark plug and lean limit is high, whereby misfire is unlikely. Here, the fuel for afterburning contributing to catalyst warm-up (supplied from intake manifold injector 120) in a required amount is supplied (as a result of corrective increase). As this fuel for afterburning is available, catalyst warm-up can be achieved.

At step S130, engine ECU 300 determines whether to end rapid catalyst warm-up. As described above, it is determined that rapid catalyst warm-up should be ended if three-way catalytic converter 90 is activated based on variation in the detection signal from the oxygen sensor provided downstream of three-way catalytic converter 90. Alternatively, whether to end rapid catalyst warm-up may be determined based on the temperature of the engine coolant or the temperature of the engine oil. Further alternatively, whether to end rapid catalyst warm-up may be determined based on whether or not the temperature of the engine coolant has been raised by at least a predetermined amount since the start. Further alternatively, whether to end rapid catalyst warm-up may be determined by determining whether or not engine 10 has been operating for a predetermined time period or longer, based on an accumulated amount of intake air. If it is determined that rapid catalyst warm-up should be ended (YES at S130), the process proceeds to S200. Otherwise (NO at S130), the process returns to S120.

At step S200, engine ECU 300 detects an engine coolant temperature THW based on data input from coolant temperature sensor 380. At S210, engine ECU 300 determines whether detected engine coolant temperature THW is not lower than a predetermined temperature threshold value THW(TH). For example, THW(TH) is set to a value from 70 to 90° C. If engine coolant temperature THW is equal to or higher than temperature threshold value THW(TH) (YES at S210), the process proceeds to S220. Otherwise(NO at S210), the process proceeds to S230.

Figure 6:
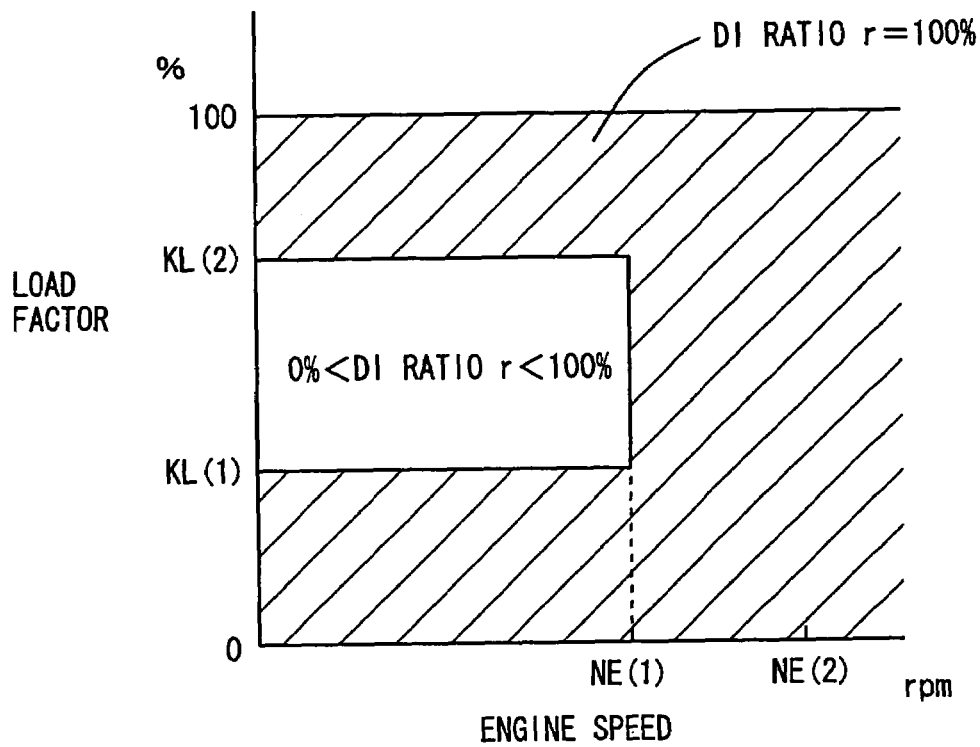
FIGS. 6 and 7 illustrate a first example of DI ratio maps in a warm state and a cold state respectively, of an engine to which the control device according to the embodiment of the present invention is suitably adapted.
Figure 8:
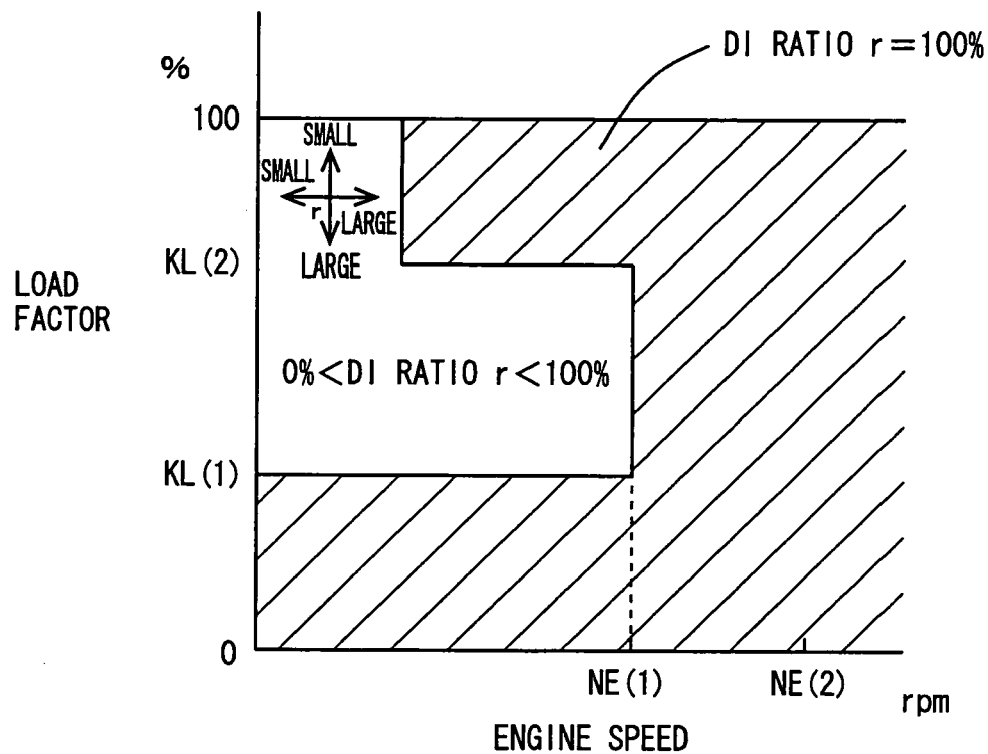
FIGS. 8 and 9 illustrate a second example of DI ratio maps in a warm state and a cold state respectively, of an engine to which the control device according to the embodiment of the present invention is suitably adapted.

At step S220, engine ECU 300 selects a map for a warm state (FIG. 6 or 8 which will be described later).

Figure 7:
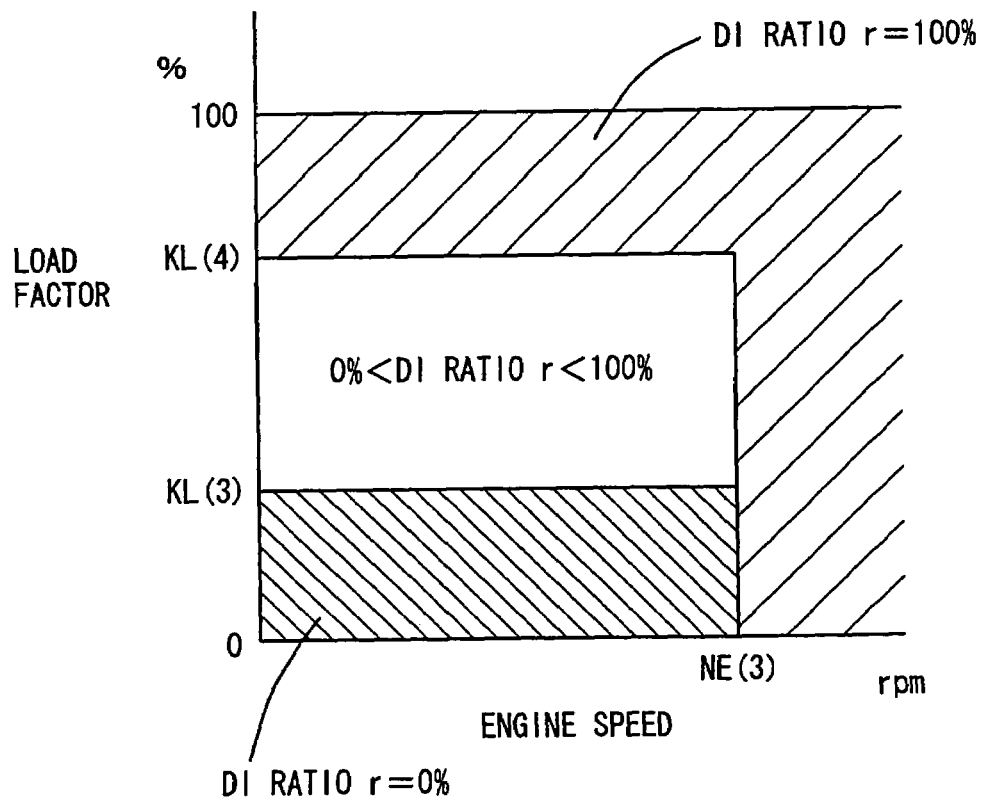
Figure 9:
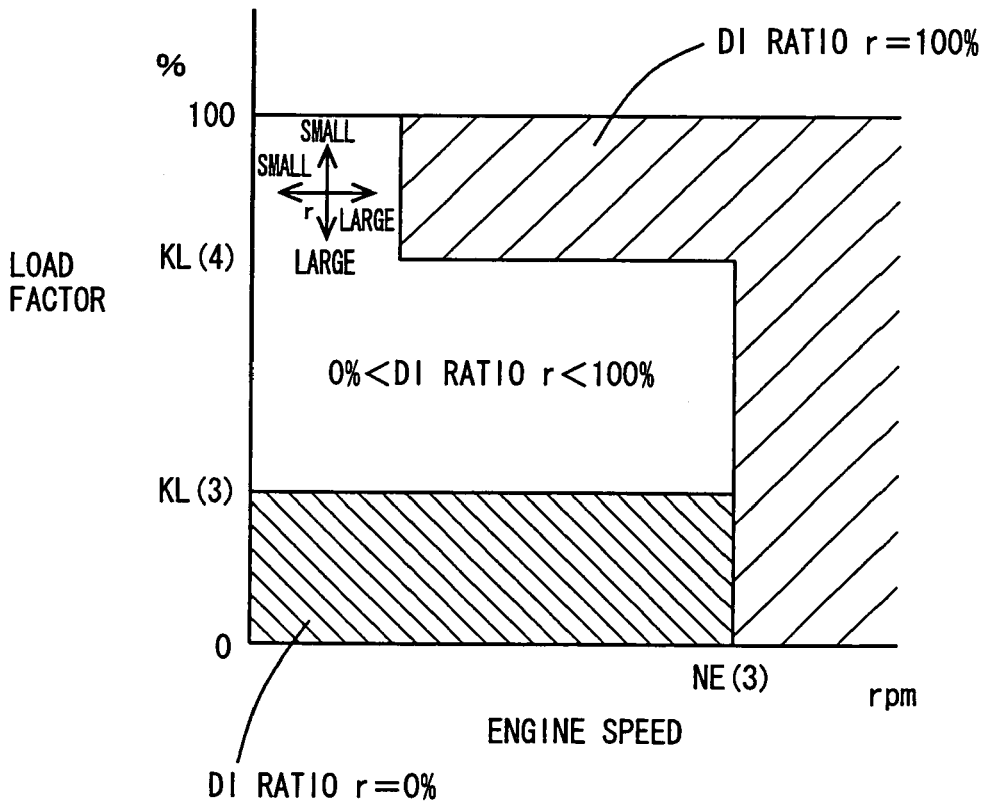

At step S230, engine ECU 300 selects a map for a cold state (FIG. 7 or 9 which will be described later).

At step S240, engine ECU 300 calculates DI ratio r based on the engine speed and load factor of engine 10 according to the selected map. The engine speed of engine 10 is calculated based on data input from engine speed sensor 460, and the load factor is calculated based on data input from accelerator position sensor 440 and a running state of the vehicle.

At step S250, engine ECU 300 calculates the amount of fuel injection. The amount of fuel injection from in-cylinder injector 110 and the amount of fuel injection from intake manifold injector 120 can be calculated based on this fuel injection amount and DI ratio r.

At step S260, engine ECU 300 determines whether the load factor of engine 10 is not lower than a predetermined threshold value and whether or not fuel is injected from in-cylinder injector 110 and intake manifold injector 120 at a ratio predetermined therebetween. If the load factor of engine 10 is equal to or greater than the predetermined threshold value and if fuel is injected from in-cylinder injector 110 and intake manifold injector 120 at a ratio predetermined therebetween (YES at S260), the process proceeds to S270. Otherwise (NO at S260), the process proceeds to S280.

At step S270, engine ECU 300 calculates when to inject fuel from intake manifold injector 120 as during a period in which intake valve 122 is open (in synchronization with air intake).

At step S280, engine ECU 300 calculates when to inject fuel from intake manifold injector 120 as during a period in which intake valve 122 is closed.

Thereafter, engine ECU 300 controls in-cylinder injector 110 and intake manifold injector 120 based on the calculated fuel injection amount and injection timing, and performs fuel injection.

An operation of engine 10 controlled by engine ECU 300 representing the control device of the internal combustion engine according to the present embodiment based on the configuration and the flowchart above will now be described.

<During Abnormal Operation of Engine>

For example, immediately after engine 10 is started and while engine 10 is cold, engine ECU 300 controls engine 10 assuming that it is in the abnormal operation (YES at S100 and YES at S110). Here, as the catalyst is not activated, emission of the exhaust gas to the atmosphere should be avoided in such a state. Accordingly, a stratified charge combustion mode is set in this case, in which fuel is injected from in-cylinder injector 110 in the compression stroke, to conduct stratified charge combustion (rapid catalyst warm-up control in FIG. 5 corresponds to control in the abnormal state). Here, stratified charge combustion is conducted for a period of several seconds to several tens of seconds.

As used herein, the stratified charge combustion includes both the stratified charge combustion and semi-stratified charge combustion. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture locally around the spark plug, so as to improve the combustion state. Such semi-stratified charge combustion is preferable in the catalyst warm-up operation for the following reasons. In the catalyst warm-up operation, it is necessary to considerably retard the ignition timing and maintain a favorable combustion state (idle state) so as to cause a high-temperature combustion gas to reach the catalyst. Further, a certain amount of fuel needs to be supplied. If the stratified charge combustion is employed to satisfy these requirements, the amount of the fuel will be insufficient. If the homogeneous combustion is employed, the retarded amount for the purpose of. maintaining favorable combustion is small compared to the case of stratified charge combustion. For these reasons, the above-described semi-stratified charge combustion is preferably employed in the catalyst warm-up operation, although either of stratified charge combustion and semi-stratified charge combustion may be employed.

<During Cold State of Engine>

The map for the cold state (FIG. 7 or 9 which will be described later) is selected (S230) until rapid catalyst warm-up ends (YES at S130) and the temperature of engine 10 (engine coolant temperature THW) raised after the start of engine 10 is set to the predetermined temperature threshold value (for example, 80° C.) (NO at S210).

DI ratio r which represents the injection ratio of in-cylinder injector 1 10 is calculated based on the selected map for the cold state (FIG. 7 or 9 which will be described later) as well as on the engine speed and the load factor of engine 10 (S240). The amount of fuel injection is calculated based on the output requested in engine 10 or the like (S250).

<During Warm State of Engine>

When the temperature of engine 10: is further raised and the temperature of engine 10 (engine coolant temperature TRW) attains to the predetermined temperature threshold value or higher (for example, 80° C.) (YES at S210), the map for the warm state (FIG. 6 or 8 which will be described later) is selected (S220).

DI ratio r which represents the injection ratio of in-cylinder injector 110 is calculated based on the selected map for the warm state (FIG. 6 or 8 which will be described later) as well as on the engine speed and the load factor of engine 10 (S240). The amount of fuel injection is calculated based on the output requested in engine 10 or the like (S250).

<Timing of Fuel Injection from Injector>

If the load factor of engine 10 is high and if fuel is injected from in-cylinder injector 110 and intake manifold injector 120 at the ratio predetermined therebetween (YES at S260), when to inject fuel from intake manifold injector 120 is calculated as the time in synchronization with air intake, that is, as during a period in which intake valve 122 is open (S270).

If the load factor of engine 10 is low or if fuel is not injected from in-cylinder injector 110 and intake manifold injector 120 at the ratio predetermined therebetween (NO at S260), when to inject fuel from intake manifold injector 120 is calculated as during a period in which intake valve 122 is closed (S280). If the load factor of engine 10 is low, intake valve 122 is closed when fuel is injected from intake manifold injector 120. Accordingly, as shown in FIG. 3, the fuel in the liquid state adheres to the inner wall of the intake manifold, the backside of the umbrella-shaped portion of intake valve 122, the valve stem of intake valve 122, or the like. On the other hand, the temperature of the portion where the fuel is adhered is sufficiently high relative to the boiling point of the fuel even in the cold state, to say nothing of the warm-state. Therefore, the fuel is vaporized in intake manifold 20 by the time of opening of intake valve 122 (by the time of the start of the intake stroke).

If intake valve 122 opens in this state, the vaporized fuel is introduced in the combustion chamber. Homogeneity is thus improved and satisfactory homogenous combustion can be achieved.

In any case (YES at S260 and NO at S260), when to inject fuel from in-cylinder injector 110 is calculated as the time in synchronization with air intake, that is, as during a period in which intake valve 122 is open. Accordingly, the fuel injected from in-cylinder injector 110 is diffused homogenously along cavity 123C in the combustion chamber by a flow of the intake air. Consequently, homogeneity of distributed fuel (distribution of the air-fuel ratio) in the combustion chamber can be improved and satisfactory homogenous combustion can be achieved.

As described above, in the engine controlled by the engine ECU according to the present embodiment, while the fuel is injected from the in-cylinder injector and the intake manifold injector at a ratio predetermined therebetween in the normal operation state other than the abnormal operation state represented by rapid catalyst warm-up, for example, control of fuel injection from the in-cylinder injector and the intake manifold injector is carried out based on the maps determined by the engine speed and the load of the engine that are set separately for the warm state and the cold state of the internal combustion engine. Here, fuel injection control is carried out based on the map such that homogenous combustion can be achieved in all regions. If a large load is not requested in such a case, fuel is injected from the intake manifold injector while the intake valve is closed. In this manner, even if the fuel is adhered to the wall surface of the intake manifold or the like as a result of fuel injection from the intake manifold injector while the intake valve is closed, the fuel is immediately vaporized because of the high temperature. Accordingly, the vaporized fuel is introduced into the combustion chamber when the intake valve opens, and adhesion of the fuel in the liquid state in the injection hole located at the tip end of the in-cylinder injector and hence accumulation of deposits is unlikely. Moreover, as the vaporized fuel is introduced in the combustion chamber, homogeneity can be improved.

<Engine (1) to Which Present Control Device is Suitably Adapted>

An engine (1) to which the control device of the present embodiment is suitably adapted will now be described.

Referring to FIGS. 6 and 7, maps each indicating a fuel injection ratio between in-cylinder injector 110 and intake manifold injector 120 (hereinafter, also referred to as a DI ratio (r)), identified as information associated with an operation state of engine 10, will now be described. The maps are stored in ROM 320 of engine ECU 300. FIG. 6 is the map for a warm state of engine 10, and FIG. 7 is the map for a cold state of engine 10.

In the maps illustrated in FIGS. 6 and 7, with the horizontal axis representing an engine speed of engine 10 and the vertical axis representing a load factor, the fuel injection ratio of in-cylinder injector 110, or the DI ratio r, is expressed in percentage.

As shown in FIGS. 6 and 7, the DI ratio r is set for each operation region that is determined by the engine speed and the load factor of engine 10. "DI RATIO r=100%" represents the region where fuel injection is carried out using only in-cylinder injector 110, and "DI RATIO r=0%" represents the region where fuel injection is carried out using only intake manifold injector 120. "DI RATIO r≠0%", "DI RATIO r≠100%" and "0%<DI RATIO r<100%" each represent the region where fuel injection is carried out using both in-cylinder injector 110 and intake manifold injector 120. Generally, in-cylinder injector 110 contributes to an increase of output performance, while intake manifold injector 120 contributes to uniformity of the air-fuel mixture. These two kinds of injectors having different characteristics are appropriately selected depending on the engine speed and the load factor of engine 10, so that only homogeneous combustion is conducted in the normal operation state of engine 10 (other than the abnormal operation state such as a catalyst warm-up state during idling).

Further, as shown in FIGS. 6 and 7, the fuel injection ratio between in-cylinder injector 110 and intake manifold injector 120, or the DI ratio r, is defined individually in the map for the warm state and in the map for the cold state of the engine. The maps are configured to indicate different control regions of in-cylinder injector 110 and intake manifold injector 120 as the temperature of engine 10 changes. When the temperature of engine 10 detected is equal to or higher than a predetermined temperature threshold value, the map for the warm state shown in FIG. 6 is selected; otherwise, the map for the cold state shown in FIG. 7 is selected. One or both of in-cylinder injector 110 and intake manifold injector 120 are controlled based on the selected map and according to the engine speed and the load factor of engine 10.

The engine speed and the load factor of engine 10 set in FIGS. 6 and 7 will now be described. In FIG. 6, NE(1) is set to 2500 rpm to 2700 rpm, KL(1) is set to 30% to 50%, and KL(2) is set to 60% to 90%. In FIG. 7, NE(3) is set to 2900 rpm to 3100 rpm. That is, NE(1)<NE(3). NE(2) in FIG. 6 as well as KL(3) and KL(4) in FIG. 7 are also set as appropriate.

When comparing FIG. 6 and FIG. 7, NE(3) of the map for the cold state shown in FIG. 7 is greater than NE(1) of the map for the warm state shown in FIG. 6. This shows that, as the temperature of engine 10 is lower, the control region of intake manifold injector 120 is expanded to include the region of higher engine speed. That is, in the case where engine 10 is cold, deposits are unlikely to accumulate in the injection hole of in-cylinder injector 110 (even if the fuel is not injected from in-cylinder injector 110). Thus, the region where the fuel injection is to be carried out using intake manifold injector 120 can be expanded, to thereby improve homogeneity.

When comparing FIG. 6 and FIG. 7, "DI RATIO r=100%" in the region where the engine speed of engine 10 is NE(1) or higher in the map for the warm state, and in the region where the engine speed is NE(3) or higher in the map for the cold state. In terms of load factor, "DI RATIO r=100%" in the region where the load factor is KL(2) or greater in the map for the warm state, and in the region where the load factor is KL(4) or greater in the map for the cold state. This means that in-cylinder injector 110 alone is used in the region of a predetermined high engine speed, and in the region of a predetermined high engine load. That is, in the high speed region or the high load region, even if fuel injection is carried out using only in-cylinder injector 110, the engine speed and the load of engine 10 are high, ensuring a sufficient intake air amount, so that it is readily possible to obtain a homogeneous air-fuel mixture even using only in-cylinder injector 110. In this manner, the fuel injected from in-cylinder injector 110 is atomized within the combustion chamber involving latent heat of vaporization (or, absorbing heat from the combustion chamber). Thus, the temperature of the air-fuel mixture is decreased at the compression end, whereby antiknock performance is improved. Further, since the temperature within the combustion chamber is decreased, intake efficiency improves, leading to high power output.

In the map for the warm state in FIG. 6, fuel injection is also carried out using only in-cylinder injector 110 when the load factor is KL(1) or less. This shows that in-cylinder injector 110 alone is used in a predetermined low load region when the temperature of engine 10 is high. When engine 10 is in the warm state, deposits are likely to accumulate in the injection hole of in-cylinder injector 110. However, when fuel injection is carried out using in-cylinder injector 110, the temperature of the injection hole can be lowered, whereby accumulation of deposits is prevented. Further, clogging of in-cylinder injector 110 may be prevented while ensuring the minimum fuel injection amount thereof. Thus, in-cylinder injector 110 alone is used in the relevant region.

When comparing FIG. 6 and FIG. 7, there is a region of "DI RATIO r=0%" only in the map for the cold state in FIG. 7. This shows that fuel injection is carried out using only intake manifold injector 120 in a predetermined low load region (KL(3) or less) when the temperature of engine 10 is low. When engine 10 is cold and low in load and the intake air amount is small, atomization of the fuel is unlikely to occur. In such a region, it is difficult to ensure favorable combustion with the fuel injection from in-cylinder injector 110. Further, particularly in the low-load and low-speed region, high output using in-cylinder injector 110 is unnecessary. Accordingly, fuel injection is carried out using only intake manifold injector 120, rather than in-cylinder injector 110, in the relevant region.

Further, in an operation other than the normal operation, or in the catalyst warm-up state during idling of engine 10 (abnormal operation state), in-cylinder injector 110 is controlled to carry out stratified charge combustion. By causing the stratified charge combustion only during the catalyst warm-up operation, warming up of the catalyst is promoted, and exhaust emission is thus improved.

<Engine (2) to Which Present Control Device is Suitably Adapted>

Hereinafter, an engine (2) to which the control device of the present embodiment is suitably adapted will be described. In the following description of the engine (2), the configurations similar to those of the engine (1) will not be repeated.

Referring to FIGS. 8 and 9, maps each indicating the fuel injection ratio between in-cylinder injector 110 and intake manifold injector 120, identified as information associated with the operation state of engine 10, will be described. The maps are stored in ROM 320 of engine ECU 300. FIG. 8 is the map for the warm state of engine 10, and FIG. 9 is the map for the cold state of engine 10.

FIGS. 8 and 9 differ from FIGS. 6 and 7 in the following points. "DI RATIO r=100%" holds in the region where the engine speed of engine 10 is equal to or higher than NE(1) in the map for the warm state, and in the region where engine 10 speed is NE(3) or higher in the map for the cold state. Further, except for the low-speed region, "DI RATIO r=100%" holds in the region where the load factor is KL(2) or greater in the map for the warm state, and in the region where the load factor is KL(4) or greater in the map for the cold state. This means that fuel injection is carried out using only in-cylinder injector 110 in the region where the engine speed is at a predetermined high level, and that fuel injection is often carried out using only in-cylinder injector 110 in the region where the engine load is at a predetermined high level. However, in the low-speed and high-load region, mixing of an air-fuel mixture formed by the fuel injected from in-cylinder injector 110 is poor, and such inhomogeneous air-fuel mixture within the combustion chamber may lead to unstable combustion. Thus, the fuel injection ratio of in-cylinder injector 110 is increased as the engine speed increases where such a problem is unlikely to occur, whereas the fuel injection ratio of in-cylinder injector 110 is decreased as the engine load increases where such a problem is likely to occur. These changes in the DI ratio r are shown by crisscross arrows in FIGS. 8 and 9. In this manner, variation in output torque of the engine attributable to the unstable combustion can be suppressed. It is noted that these measures are approximately equivalent to the measures to decrease the fuel injection ratio of in-cylinder injector 110 as the state of engine 10 moves toward the predetermined low speed region, or to increase the fuel injection ratio of in-cylinder injector 110 as engine 10 state moves toward the predetermined low load region. Further, except for the relevant region (indicated by the crisscross arrows in FIGS. 8 and 9), in the region where fuel injection is carried out using only in-cylinder injector 110 (on the high speed side and on the low load side), a homogeneous air-fuel mixture is readily obtained even when the fuel injection is carried out using only in-cylinder injector 10. In this case, the fuel injected from in-cylinder injector 10 is atomized within the combustion chamber involving latent heat of vaporization (by absorbing heat from the combustion chamber). Accordingly, the temperature of the air-fuel mixture is decreased at the compression end, and thus, the antiknock performance improves. Further, with the temperature of the combustion chamber decreased, intake efficiency improves, leading to high power output.

In engine 10 explained in conjunction with FIGS. 6–9, homogeneous combustion is achieved by setting the fuel injection timing of in-cylinder injector 110 in the intake stroke, while stratified charge combustion is realized by setting it in the compression stroke. That is, when the fuel injection timing of in-cylinder injector 110 is set in the compression stroke, a rich air-fuel mixture can be located locally around the spark plug, so that a lean air-fuel mixture in the combustion chamber as a whole is ignited to realize the stratified charge combustion. Even if the fuel injection timing of in-cylinder injector 110 is set in the intake stroke, stratified charge combustion can be realized if it is possible to provide a rich air-fuel mixture locally around the spark plug.

As used herein, the stratified charge combustion includes both the stratified charge combustion and semi-stratified charge combustion. In the semi-stratified charge combustion, intake manifold injector 120 injects fuel in the intake stroke to generate a lean and homogeneous air-fuel mixture in the whole combustion chamber, and then in-cylinder injector 110 injects fuel in the compression stroke to generate a rich air-fuel mixture around the spark plug, so as to improve the combustion state. Such semi-stratified charge combustion is preferable in the catalyst warm-up operation for the following reasons. In the catalyst warm-up operation, it is necessary to considerably retard the ignition timing and maintain a favorable combustion state (idle state) so as to cause a high-temperature combustion gas to reach the catalyst. Further, a certain amount of fuel needs to be supplied. If the stratified charge combustion is employed to satisfy these requirements, the amount of the fuel will be insufficient. If the homogeneous combustion is employed, the retarded amount for the purpose of maintaining favorable combustion is small compared to the case of stratified charge combustion. For these reasons, the above-described semi-stratified charge combustion is preferably employed in the catalyst warm-up operation, although either of stratified charge combustion and semi-stratified charge combustion may be employed.

Further, in the engine explained in conjunction with FIGS. 6–9, the fuel injection timing of in-cylinder injector 110 is set in the intake stroke in a basic region corresponding to the almost entire region (here, the basic region refers to the region other than the region where semi-stratified charge combustion is carried out with fuel injection from intake manifold injector 120 in the intake stroke and fuel injection from in-cylinder injector 110 in the compression stroke, which is carried out only in the catalyst warm-up state). The fuel injection timing of in-cylinder injector 110, however, may be set temporarily in the compression stroke for the purpose of stabilizing combustion, for the following reasons.

When the fuel injection timing of in-cylinder injector 110 is set in the compression stroke, the air-fuel mixture is cooled by the injected fuel while the temperature in the cylinder is relatively high. This improves the cooling effect and, hence, the antiknock performance. Further, when the fuel injection timing of in-cylinder injector 110 is set in the compression stroke, the time from the fuel injection to the ignition is short, which ensures strong penetration of the injected fuel, so that the combustion rate increases. The improvement in antiknock performance and the increase in combustion rate can prevent variation in combustion, and thus, combustion stability is improved.

Regardless of the temperature of engine 10 (that is, whether engine 10 is in the warm state or in the cold state), the map for the warm state shown in FIGS. 6 or 8 may be used during idle-off state (when an idle switch is off, or when the accelerator pedal is pressed) (in-cylinder injector 110 is used in the low-load region regardless of whether the engine is in the cold state or in the warm state).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device of an internal combustion engine including a first fuel injection mechanism injecting fuel into a cylinder and a second fuel injection mechanism injecting fuel into an intake manifold, comprising:
   a control unit controlling said first fuel injection mechanism and said second fuel injection mechanism based on information associated with an operation state of said internal combustion engine,
   wherein, said internal combustion engine is a spark ignition engine, and
   when homogenous combustion should be conducted by injecting fuel at least from said second fuel injection mechanism, said control unit controls fuel injection such that fuel is injected from said second fuel injection mechanism while an intake valve is closed.

2. The control device of an internal combustion engine according to claim 1, wherein
   said control unit further includes an injection control unit controlling fuel injection such that fuel is injected from said first fuel injection mechanism while the intake valve is open.

3. The control device of an internal combustion engine according to claim 1, further comprising:
   a determination unit determining whether said internal combustion engine is in a normal operation state, said determination unit determining that said internal combustion engine is in the normal operation state when said internal combustion engine is in a state other than an idle state; and
   an injection control unit controlling said fuel injection mechanism so as to conduct homogenous combustion when said internal combustion engine is in said normal operation state.

4. The control device of an internal combustion engine according to claim 1, further comprising:
   a determination unit determining whether said internal combustion engine is in a normal operation state, said determination unit determining that said internal combustion engine is in an abnormal operation state, in a catalyst warm-up operation during idling; and
   an injection control unit controlling said fuel injection mechanism so as to conduct stratified charge combustion when said internal combustion engine is in said abnormal operation state.

5. The control device of an internal combustion engine according to claim 1, wherein
   said information includes information representing an injection ratio between said first fuel injection mechanism and said second fuel injection mechanism, that is defined based on an engine speed and a load factor of the internal combustion engine.

6. The control device of an internal combustion engine according to claim 1, wherein
   said first fuel injection mechanism is an in-cylinder injector, and
   said second fuel injection mechanism is an intake manifold injector.

7. A control device of an internal combustion engine including a first fuel injection mechanism injecting fuel into a cylinder and a second fuel injection mechanism injecting fuel into an intake manifold, comprising:
   control means for controlling said first fuel injection mechanism and said second fuel injection mechanism based on information associated with an operation state of said internal combustion engine,
   wherein, said internal combustion engine is a spark ignition engine, and
   when homogenous combustion should be conducted by injecting the fuel at least from said second fuel injection mechanism, said control means includes means for controlling fuel injection such that fuel is injected from said second fuel injection mechanism while an intake valve is closed.

8. The control device of an internal combustion engine according to claim 7, wherein
   said control means further includes means for controlling fuel injection such that fuel is injected from said first fuel injection mechanism while the intake valve is open.

9. The control device of an internal combustion engine according to claim 7, further comprising:
   determination means for determining whether said internal combustion engine is in a normal operation state, said determination means determining that said internal combustion engine is in the normal operation state when said internal combustion engine is in a state other than an idle state; and
   injection control means for controlling said fuel injection mechanism so as to conduct homogenous combustion when said internal combustion engine is in said normal operation state.

10. The control device of an internal combustion engine according to claim 7, further comprising:
   determination means for determining whether said internal combustion engine is in a normal operation state, said determination means including means for determining that said internal combustion engine is in an abnormal operation state, in a catalyst warm-up operation during idling; and
   means for controlling said fuel injection mechanism so as to conduct stratified charge combustion when said internal combustion engine is in said abnormal operation state.

11. The control device of an internal combustion engine according to claim 7, wherein
   said information includes information representing an injection ratio between said first fuel injection mechanism and said second fuel injection mechanism, that is defined based on an engine speed and a load factor of the internal combustion engine.

12. The control device of an internal combustion engine according to claim 7, wherein
   said first fuel injection mechanism is an in-cylinder injector, and
   said second fuel injection mechanism is an intake manifold injector.

13. A control device of an internal combustion engine including an in-cylinder injector injecting fuel into a cylinder and an intake manifold injector injecting fuel into an intake manifold, comprising an electronic control unit (ECU).
   wherein said electronic control unit (ECU) controls said in-cylinder injector and said intake manifold injector based on information associated with an operation state of said internal combustion engine, and
   wherein, said internal combustion engine is a spark ignition engine, and
   when homogenous combustion should be conducted by injecting fuel at least from said second fuel injection mechanism, said electronic control unit (ECU) controls fuel injection such that fuel is injected from said intake manifold injector while an intake valve is closed.

* * * * *